(12) United States Patent
Johnke et al.

(10) Patent No.: US 12,410,331 B2
(45) Date of Patent: Sep. 9, 2025

(54) LED-CURABLE OFFSET INKS CONTAINING ALUMINUM ADDITIVES

(71) Applicant: SUN CHEMICAL B.V., LV Weesp (NL)

(72) Inventors: Christian Johnke, Karlstein am Main (DE); Kai-Uwe Gaudl, Karlstein am Main (DE); Matthias Hellblau, Karlstein am Main (DE)

(73) Assignee: SUN CHEMICAL B.V., Weesp (NL)

( * ) Notice: Subject to any disclaimer, the term of this patent is extended or adjusted under 35 U.S.C. 154(b) by 0 days.

(21) Appl. No.: 18/859,926

(22) PCT Filed: Sep. 22, 2023

(86) PCT No.: PCT/EP2023/076287
§ 371 (c)(1),
(2) Date: Oct. 24, 2024

(87) PCT Pub. No.: WO2024/068483
PCT Pub. Date: Apr. 4, 2024

(65) Prior Publication Data
US 2025/0109307 A1    Apr. 3, 2025

(30) Foreign Application Priority Data
Sep. 30, 2022 (EP) .................................. 22199131

(51) Int. Cl.
*C09D 11/101* (2014.01)
*B41J 2/01* (2006.01)
(Continued)

(52) U.S. Cl.
CPC ............... *C09D 11/101* (2013.01); *B41J 2/01* (2013.01); *B41J 2/2107* (2013.01); *C09D 11/03* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 3,673,140 A * 6/1972 Ackerman ........... C09D 11/101
523/508
4,221,686 A * 9/1980 Sakiyama ............ C09D 11/101
522/75
(Continued)

FOREIGN PATENT DOCUMENTS

CN    106046335 A    10/2016
CN    110669437 A    1/2020
(Continued)

OTHER PUBLICATIONS

Koenig et al in "A review of polymer dissolution", vol. 28, Issue 8, Aug. 2003, pp. 1223-1270.
(Continued)

*Primary Examiner* — Manish S Shah
(74) *Attorney, Agent, or Firm* — Marian E. Fundytus; Amster Rothstein & Ebenstein LLP

(57) ABSTRACT

An LED curable lithographic ink comprising: 25-85% of one or more acrylates, wherein at least one acrylate is a pentaacrylate or hexaacrylate; 0-20% of one or more photoinitiators; 5-60% of one or more rosin-modified polyester resins, wherein the rosin-modified polyester resin has a molecular weight of 5,000 to 35,000 Daltons; 0.2-5% of one or more aluminum additives; 0.1-5% of one or more polymerization stabilizers; and 0-50% colorant.

24 Claims, 1 Drawing Sheet

(51) Int. Cl.
*B41J 2/21* (2006.01)
*C09D 11/03* (2014.01)
*C09D 11/037* (2014.01)
*C09D 11/104* (2014.01)
*C09D 11/322* (2014.01)

(52) U.S. Cl.
CPC .......... *C09D 11/037* (2013.01); *C09D 11/104* (2013.01); *C09D 11/322* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 4,536,468 A * | 8/1985 | Yasui | C09D 11/101 430/288.1 |
| 5,212,213 A | 5/1993 | Hutter | |
| 6,638,995 B1 * | 10/2003 | Gelarden | C09D 11/106 523/160 |
| 7,232,851 B2 | 6/2007 | Miezeiwski | |
| 2003/0054103 A1 * | 3/2003 | Sato | C09D 11/101 427/256 |
| 2003/0077384 A1 * | 4/2003 | Krysa | B05B 7/1626 427/427 |
| 2007/0232786 A1 | 10/2007 | Gaudl | |
| 2019/0023916 A1 * | 1/2019 | Gaudl | C09D 11/101 |
| 2020/0123324 A1 * | 4/2020 | Nakano | C09D 185/00 |
| 2022/0098421 A1 * | 3/2022 | Hishinuma | B41J 2/2107 |

FOREIGN PATENT DOCUMENTS

| | | |
|---|---|---|
| CN | 113881280 A | 1/2022 |
| CN | 216069197 U | 3/2022 |
| EP | 3434711 B1 | 7/2021 |
| JP | 2000080326 A | 3/2000 |
| JP | 2002308935 A | 10/2002 |
| JP | 2002327136 A | 11/2002 |
| JP | 2005015755 A | 1/2005 |
| JP | 2018150469 A | 9/2018 |
| JP | 2020023670 A | 2/2020 |
| JP | 2022120820 A | 8/2022 |
| JP | 2023085694 A | 6/2023 |

OTHER PUBLICATIONS

International Search Report issued in International Application No. PCT/EP2023/076287, mailed Dec. 14, 2023.
Written Opinion of the International Searching Authority issued in International Application No. PCT/EP2023/076287, mailed Dec. 14, 2023.
International Preliminary Report on Patentability (Chapter II of the Patent Cooperation Treaty) issued in International Application No. PCT/US2023/076287, mailed May 17, 2024.
Office Action issued in CN Application No. 202380045967.9 mailed Apr. 3, 2025, with English language translation thereof.
Office Action issued in JP Application No. 2024-568866 mailed Jul. 15, 2025, with English language translation thereof.

* cited by examiner

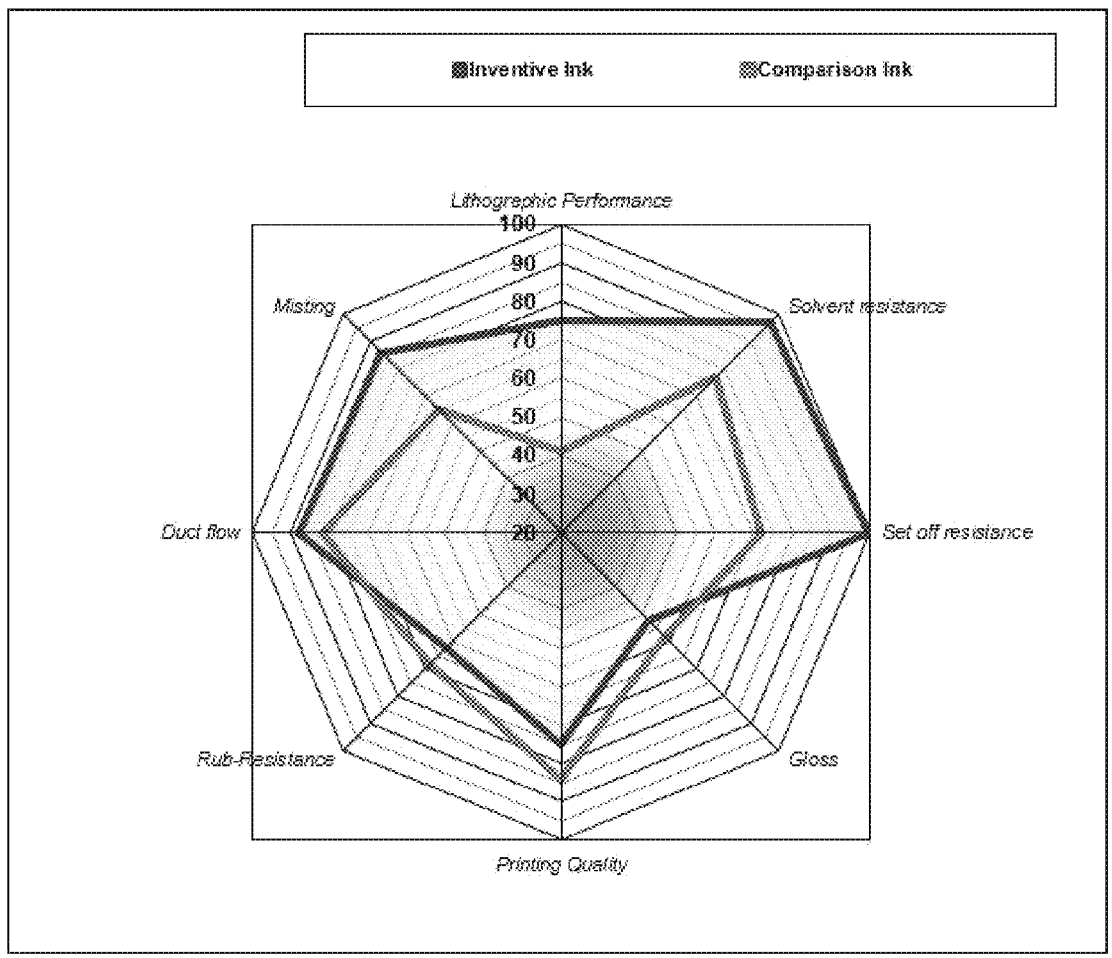

LED-CURABLE OFFSET INKS CONTAINING ALUMINUM ADDITIVES

CROSS REFERENCE TO RELATED APPLICATIONS

The present application is a § 371 National Phase application based on PCT/EP2023/076287 filed Sep. 22, 2023, which claims the benefit of EP Application No. EP22199131.8, filed Sep. 30, 2022, the subject matter of each of which is incorporated by reference in their entirety.

The present invention relates to LED curable printing ink or varnish compositions suitable for offset printing. In particular, the present invention is directed to LED curable varnishes and inks applied by offset printing containing an aluminum additive.

The inks and varnishes of the present invention are more sustainable than traditional UV-curable inks and varnishes as they can be cured with LED light, which requires less energy.

Furthermore, the present invention is related to printed matter comprising or derived from the ink or varnish compositions according to the invention, suitable for graphic applications and packaging applications.

UV-LED light lamp curing has increased in use as the technology offers various advantages such as: energy saving; extended life over conventional UV-bulbs; and a safe, mercury-free product. Moreover, UV-LED lamps do not generate ozone, in contrast to the typical mercury UV-bulbs, which have been the state of the art in UV-technology for many years.

Thus, in the graphic arts sector, printing presses are increasingly being equipped or refitted with compact UV-LED dryers. State of the art LED dryers usually emit LED light at peak wavelength of 365-405 nm.

LED offset inks, which can for example be printed with a sheet-fed or web-presses equipped with a LED dryer, are state of the art. They combine the above-mentioned advantages of LED-drying (i.e., LED-curing) with a sustainable (A-free, i.e., solvent free) application and fast drying (high productivity), compared to solvent-based inks or inks based on vegetable or mineral oils.

However, UV-LED inks, similar to UV inks, often exhibit poor lithographic press performance compared to conventional inks, based on vegetable or mineral oils. One reason for this behavior is attributed to the higher polarity of acrylates vs oils, which render UV-LED inks more polar, which can then adversely affect the lithographic printing process and fountain interaction.

Another drawback of the UV-LED technology can also be poor surface cure, caused by oxygen inhibition. Oxygen inhibition refers to the fact that oxygen as a bi-radical can easily react with the formed radicals of the photoinitiator or radicals on the monomer or growing polymer chain and render them inactive, usually as a peroxide derivative. This can lead to insufficient drying at the ink or coating surfaces where oxygen is predominant. This is especially problematic with commercial long wavelength UV-LED light dryers emitting at 365-405 nm, because the shorter wavelengths are missing, which are very helpful for good surface cure and activating photoinitiator radicals at or near the surface.

This is often counteracted by using very reactive, multifunctional monomers such as dipentaerythritol hexaacrylate to favor the polymerization speed over the oxygen inhibition process.

However, the extensive use of multifunctional monomers (such as dipentaerythritol hexaacrylate), imparting a high crosslinking density, often imparts brittleness in the inks, which can adversely affect adhesion. Moreover, such acrylate monomers can also cause poor print performance.

To impart better lithographic properties into UV inks and reduce brittleness, rosin resins which are successfully used in conventional inks, can also be used in UV inks, such as in for example in U.S. Pat. No. 5,212,213 or U.S. Pat. No. 7,232,851 and EP3433711, provided that they show sufficient solubility in acrylates.

U.S. Pat. No. 5,212,213 mentions the use of fully fumarated rosin and/or fully maleated rosin to produce a higher softening point and allow 100% solid resin to be produced. In the current invention there is higher risk of polymerization during the ink or varnish making process due to high temperature or prolonged dissolving time and, hence, the temperature is kept as low as possible while still remaining above the threshold for dissolving rosin in acrylates.

U.S. Pat. No. 7,232,851 mentions an electron-beam and/or UV curable lithographic ink composition and method of printing which merely uses a rosin that is soluble in acrylates in general, but the present invention requires rosins that also exhibit good solubility in highly functional acrylates, especially suitable for the use in LED inks, such as dipentaerythritol pentaacrylate and dipentaerythritol hexaacrylate. Specifically, the rosin used in the present invention exhibits good solubility in pentaacrylates and hexaacrylates, for example, dipentaerythritol pentaacrylate and dipentaerythritol hexaacrylate. As will be discussed in more detail below, solubility in these penta- and hexa-functional acrylates is achieved without using high temperatures (i.e., temperatures greater than 135° C.).

Another issue related to the press performance of UV and LED inks is the so-called misting. During the printing process, caused by strong centrifugal forces of the fast-turning rollers and limited cohesive forces of the ink, small ink droplets in the form of a mist, escape the fast-running rollers and contaminate the press, leading to frequent massive cleaning efforts and production stops. A typical measure to reduce misting is to increase the solid content of inks, by adding fillers or increase pigmentation.

However, a high solid content often leads to adverse effects, such as ink build up on rollers and plates caused by particle agglomeration, due to the high solids content.

EP3434711 mentions the use of rosin ester in energy-curable (EC) inks. There is no mention of LED, aluminum additive or improving misting by an aluminum additive.

The objective of the present application is to provide an LED curing offset ink with a low tendency to show misting on an offset press, while maintaining excellent press performance and LED drying properties.

Citation or identification of any document in this application is not an admission that such represents prior art to the present invention.

BRIEF DESCRIPTION OF FIGURES

FIG. 1 is Spider diagram of the inventive inks (with aluminum additive, outer curve shape) vs the comparative inks (without aluminum additive, inner curve shape). In particular, the spider diagram illustrates the ink performance scores of Inventive Examples 2A-5A versus Comparative Examples 2B-5B.

DETAILED DESCRIPTION

The present invention is further illustrated by the following set of embodiments and combinations of embodiments resulting from, for example, the dependencies and back-references as indicated. In particular, it is noted that in each instance where a range of embodiments is mentioned, for example in the context of a term such as "The method of any one of embodiments 1 to 5", every embodiment in this range is meant to be explicitly disclosed for the skilled person, i.e. the wording of this term is to be understood by the skilled person as being synonymous to "The method of any one of embodiments 1, 2, 3, 4 and 5".

The present invention provides a printing ink or varnish composition comprising:
- 25-85% of one or more acrylates, wherein at least one acrylate is a pentaacrylate or hexaacrylate;
- 0-20% of one or more photoinitiators;
- 5-60% of one or more rosin-modified polyester resins, wherein the rosin-modified polyester resin has a molecular weight of 5,000 to 35,000 Daltons;
- 0.2-5% of one or more aluminum additives;
- 0.1-5% of one or more polymerization stabilizers; and
- 0-50% colorant.

The ink or varnish composition according to the present invention is suitable for curing by UV-LED radiation.

In one aspect, the present invention provides a varnish composition comprising:
- 25-85% of one or more acrylates, wherein at least one acrylate is a pentaacrylate or hexaacrylate;
- 0-20% of one or more photoinitiators;
- 5-60% of one or more rosin-modified polyester resins, wherein the rosin-modified polyester resin has a molecular weight of 5,000 to 35,000 Daltons;
- 0.2-5% of one or more aluminum additives; and
- 0.1-5% of one or more polymerization stabilizers.

In another aspect, the present invention provides an ink composition comprising the inventive varnish and 0-50% colorant (preferably 5-40% colorant). Advantageously, the LED-curable ink containing an aluminum-modified acrylate varnish shows excellent lithographic performance and a much lower tendency for misting, while maintaining and even exceeding the performance on printing press as well as showing excellent LED curing properties.

The inks are suitable for printing onto any substrate where lithographic printing is performed, e.g., graphic papers, packaging paper, and packaging applications on carton board and foils, etc.

Preferably, the inventive LED-curable ink or varnish comprises the following materials:
- 25-85% of one or more acrylates wherein at least one acrylate is a pentaacrylate or hexaacrylate;
- 0.5-20% of photoinitiators;
- 5-60% of rosin-modified polyester resins, wherein the rosin-modified polyester resin has a molecular weight of 5,000 to 35,000 Daltons;
- 0.2-5% of aluminum additives;
- 0.1-5% of polymerization stabilizers;
- 0-50% colorants.

Acrylates (Meth)acrylic (i.e. (meth)acrylate) monomers suitable for use in the present invention include in one embodiment esters of acrylic acid or methacrylic acid with a defined structure.

A non-limiting list of examples of (meth)acrylate monomers suitable for use in this invention include n-octyl acrylate, iso-octyl acrylate, n-decyl acrylate, lauryl acrylate, stearyl acrylate, ethylene glycol diacrylate, 1,4-butandiol diacrylate, 1,6-hexandiol diacrylate, dipropylene glycol diacrylate, neopentylglycol diacrylate, ethoxylated neopentylglycol diacrylates, propoxylated neopentylglycol diacrylates, tripropylene glycol diacrylate, bisphenol A diacrylate, ethoxylated bisphenol A diacrylates, bisphenol A diglycidylether diacrylate, ethoxylated bisphenol A diacrylates, poly(ethylene)glycol diacrylates, trimethylolpropane triacrylate, ethoxylated trimethylolpropane triacrylates, propoxylated trimethylolpropane triacrylates, propoxylated glycerol triacrylates, ditrimethylolpropane tetraacrylate, pentaerythritol triacrylate, ethoxylated pentaerythritol triacrylates, propoxylated pentaerythritol tetraacrylates, ethoxylated pentaerythritol tetraacrylates, ditrimethylolpropane tetraacrylate, dipentaerythritol pentaacrylate, dipentaerythritol hexaacrylate or mixtures thereof, and the like.

In one embodiment the LED-curable varnishes or inks of the present invention comprise alkoxylated trimethylolpropane triacrylates, pentaerythritol tetraacrylate, alkoxylated pentaerythritol tetraacrylate ditrimethylolpropane tetraacrylate, dipentaerythritol pentaacrylate, dipentaerythritol hexaacrylate, alkoxylated dipentaerythritol hexaacrylate or mixtures thereof.

In one embodiment, the inks of the present invention may additionally contain an acrylate oligomer. In one embodiment, the inks of the present invention may additionally contain acrylated oligomers with a number average molecular weight of about 400-5,000 Daltons, and acrylate functionality ≥2, such as for example epoxy acrylates, polyester acrylates, acrylated polyurethanes, fatty acid modified polyester acrylates, acrylated polyethers, to impart rheology, pigment wetting, transfer, gloss, chemical resistance and other film properties.

Preferably, the ink or varnish composition of the present invention comprises a pentaacrylate or a hexaacrylate and at least one other acrylate selected from those described herein. More preferably, the ink or varnish composition of the present invention comprises a hexaacrylate and at least one other acrylate selected from those described herein.

Preferably, the ink or varnish composition of the present invention comprises dipentaerythritol pentaacrylate or dipentaerythritol hexaacrylate and at least one other acrylate selected from those described herein. More preferably, the ink or varnish composition of the present invention comprises dipentaerythritol hexaacrylate and at least one other acrylate selected from those described herein.

Preferably, the ink or varnish composition of the present invention comprises a hexaacrylate and at least one other acrylate selected from alkoxylated trimethylolpropane triacrylates, pentaerythritol tetraacrylate, alkoxylated pentaerythritol tetraacrylate ditrimethylolpropane tetraacrylate, dipentaerythritol pentaacrylate or mixtures thereof. More preferably, the ink or varnish composition of the present invention comprises dipentaerythritol hexaacrylate and at least one other acrylate selected from alkoxylated trimethylolpropane triacrylates, pentaerythritol tetraacrylate, alkoxylated pentaerythritol tetraacrylate ditrimethylolpropane tetraacrylate, dipentaerythritol pentaacrylate, alkoxylated dipentaerythritol hexaacrylate or mixtures thereof.

Preferably, the ink or varnish composition of the present invention comprises 30-70% of one or more acrylates, wherein at least one acrylate is a pentaacrylate or hexaacrylate.

Preferably, the ink or varnish of the present invention comprises 25-60% of a pentaacrylate or a hexaacrylate.

Photoinitiators

The radiation curable inks of the present invention contain photoinitiators absorbing in the UVA-area at 320-400 nm, such as for example substituted benzophenones, aminoalkylphenones, acylphosphinoxides and thioxanthones, for example 4-thiophenyl benzophenone, 4,4'-bis(diethylamino)-benzophenone, 2-benzyl-2-dimethylamino-1-(4-morpholinophenyl)-butan-1-one, 2-methyl-1-[4 (methoxy-thio)-phenyl]-2-morpholino propan-2-one, diphenylacylphenyl phosphinoxides, diphenyl(2,4,6-trimethylbenzoyl) phosphinoxide, 2,4,6-trimethylbenzoylethoxyphenyl phosphinoxide, ketocoumarines, 2-isopropylthioxanthone, 4-isopropylthioxanthone, 2,4-dimethylthioxanthone or mixtures thereof.

Preferably, the ink or varnish composition of the present invention comprises one or more photoinitiators selected from phosphine oxides, acetophenones (including aminoacetophenones), aminobenzoates, thioxanthones and combinations thereof.

For an ink designed for food packaging, migrating low molecular weight monomeric photoinitiators are advantageously minimized, or more advantageously completely replaced by oligomeric or polymeric photoinitiators, such as Omnipol TX, trademark of IGM resin company.

Preferably, the ink or varnish compositions according to the present invention comprise 0.5-20% of one or more photoinitiators, more preferably 3-18% of one or more photoinitiators, even more preferably 5-15% of one or more photoinitiators.

Rosin Resins

Rosin resins, such as for example maleic modified rosin esters or phenolic modified rosin resins are widely used as printing ink vehicles in flexographic and gravure inks. Maleic modified rosin esters often exhibit good pigment wetting, gloss retention, color retention and adhesion and usually show a better solution in acrylates than phenolic modified rosin ester. Rosin esters may be synthesized from commercial rosin such as China gum-rosin, wood rosin or tall oil rosin and difunctional acids, such as maleic acid, fumaric acid, itaconic acid along with trifunctional or tetrafunctional hydroxy compounds such as glycerol, trimethylol propane, pentaerythritol, and the like. Esters of rosin are commercially available and may be prepared as described in the "Printing Ink Manual", Fifth Edition, Blueprint, London. A preparation of for example a maleated rosin ester is specifically described in Example 1, in US2007232786. Typically, a modified rosin ester is prepared by heating a commercial rosin (e.g., a gum-rosin) with a difunctional acid (e.g., a maleic acid) and a hydroxy compound (e.g., pentaerythritol) until the desired acid value (also referred to as acid number) is obtained.

However, even though rosin esters are known in the art, the rosin resin for use in the present application should be soluble not only in acrylates in general, but also in the highly functional acrylates, especially suitable for the use in LED inks, such as dipentaerythritol pentaacrylate and dipentaerythritol hexaacrylate. As used herein, a rosin resin has good solubility in highly functional acrylates (particularly dipentaerythritol pentaacrylate or dipentaerythritol hexaacrylate) when a 30% by weight (preferably a 40% by weight, even more preferably a 50% by weight) solution of said rosin resin in said highly functional acrylate shows no visible precipitation at room temperature (i.e., 20° C.). This can be for example achieved by proper selection of the acids, such as maleic acid or maleic anhydride or cyclohexene dicarboxylic acid dianhydride or methyl cyclohexene dicarboxylic acid dianhydride and polyols, such as glycerol and trimethylol propane, providing better solubility and by limiting the molecular weight and softening point. To limit the molecular weight and to provide excellent solubility in acrylates, monofunctional acids such as benzoic acid, methyl benzoic acid, tert-butyl benzoic acid, naphthoic acid or fatty acids, such as linoleic acid can be added to the reaction mixture, to control the condensation reaction and molecular weight.

Preferably, the rosin resins used in the present invention are derived from i) a gum-rosin, wood rosin or tall oil rosin; ii) one or more difunctional acids or anhydrides; iii) one or more mono-, di-, tri- or tetra-functional polyols; and iv) one or more monofunctional acids.

Preferably, the difunctional acid or anhydride is selected from maleic acid, maleic anhydride, cyclohexene dicarboxylic acid dianhydride or methyl cyclohexene dicarboxylic acid dianhydride. More preferably, the difunctional acid or anhydride is selected from cyclohexene dicarboxylic acid dianhydride or methyl cyclohexene dicarboxylic acid dianhydride.

Preferably, the one or more mono-, di-, tri- or tetra-functional polyols is selected from glycerol or trimethylol propane.

Preferably, the one or more monofunctional acids is selected from benzoic acid, methyl benzoic acid, tert-butyl benzoic acid, naphthoic acid and linoleic acid. More preferably, the one or more monofunctional acids is selected benzoic acid, methyl benzoic acid and tert-butyl benzoic acid. More preferably still, the one or more monofunctional acids is benzoic acid.

Preferably, the rosin resins used in the present invention are derived from i) a gum-rosin, wood rosin or tall oil rosin; ii) one or more difunctional acids or anhydrides; iii) one or more mono-, di-, tri- or tetra-functional polyols; and iv) one or more monofunctional acids selected from benzoic acid, methyl benzoic acid, tert-butyl benzoic acid, naphthoic acid and linoleic acid. More preferably, the rosin resins used in the present invention are derived from i) a gum-rosin, wood rosin or tall oil rosin; ii) one or more difunctional acids or anhydrides; iii) one or more mono-, di-, tri- or tetra-functional polyols; and iv) one or more monofunctional acids selected from benzoic acid, methyl benzoic acid and tert-butyl benzoic acid.

Preferably, the rosin resins used in the present invention are derived from i) a gum-rosin, wood rosin or tall oil rosin; ii) one or more difunctional acids or anhydrides selected from maleic acid, maleic anhydride, cyclohexene dicarboxylic acid dianhydride or methyl cyclohexene dicarboxylic acid dianhydride; iii) one or more mono-, di-, tri- or tetra-functional polyols; and iv) one or more monofunctional acids selected from benzoic acid, methyl benzoic acid, tert-butyl benzoic acid, naphthoic acid and linoleic acid. More preferably, the rosin resins used in the present invention are derived from i) a gum-rosin, wood rosin or tall oil rosin; ii) one or more difunctional acids or anhydrides selected from cyclohexene dicarboxylic acid dianhydride or methyl cyclohexene dicarboxylic acid dianhydride; iii) one or more mono-, di-, tri- or tetra-functional polyols; and iv) one or more monofunctional acids selected from benzoic acid, methyl benzoic acid and tert-butyl benzoic acid.

Preferably, the rosin resins used in the present invention are derived from i) a gum-rosin, wood rosin or tall oil rosin; ii) one or more difunctional acids or anhydrides selected from cyclohexene dicarboxylic acid dianhydride or methyl cyclohexene dicarboxylic acid dianhydride; iii) one or more mono-, di-, tri- or tetra-functional polyol selected from glycerol or trimethylol propane; and iv) one or more monofunctional acids selected from benzoic acid, methyl benzoic acid and tert-butyl benzoic acid.

Moreover, to provide a hydrophobic/hydrophilic balance for the lithographic (offset) printing process, the rosin resin shall have besides the un-polar (hydrophobic) rosin units also some polar acid groups. Typically, an acid number of 5-50 mg KOH/g (preferably an acid number of 10-30 mg KOH/g) of the rosin resin is suitable. More preferably, the rosin resin has an acid value of 12-25 mg KOH/g.

Moreover, the softening point of the rosin resin is of importance. The dropping point is the temperature at which the first drop of a molten substance precipitates from a standardized cup with a defined orifice under controlled testing conditions in a furnace. It can be measured for example with an automated equipment such as DP70 from Mettler Toledo company. The temperature range at which the inventive ink or varnish can be made is limited, due to risk of polymerization of the acrylates at higher temperature. If a rosin ester has a higher softening point, e.g., >135° C., it is very difficult to dissolve below 100° C. in acrylates or it takes very long. Unlike non-polymeric materials, polymers do not dissolve instantaneously, and the dissolution is controlled by disentanglement of the polymer chains. This means a polymer has first to swell before it can dissolve, which is more difficult below the softening point (Koening et al in "A review of polymer dissolution", Volume 28, Issue 8, August 2003, Pages 1223-1270).

As a result, there is higher risk of polymerization during the ink or varnish making due to high temperature or prolonged dissolving time. Preferably, the softening point of the rosin resin shall be in the range of 70-135° C., or 85-110° C.

Before use, the suitability of the rosin resin should be tested to confirm that it has enough solubility for making an ink or varnish. Typically, the solubility of the rosin resin should be such that a stable ink or varnish in dipentaerythritol pentaacrylate or dipentaerythritol hexaacrylate at a concentration >30 weight %, or >40% is possible. Stable indicates that there is no resin precipitation at lower storage temperatures and no ink or varnish polymerization at higher storage temperatures.

Preferably, the ink or varnish composition of the invention comprises 5-50%, preferably 10-40% rosin resin.

Surprisingly, the rosin resins used in the present invention are soluble in pentaacrylate and hexaacrylate monomers (e.g., dipentaerythritol pentaacrylate and dipentaerythritol hexaacrylate) without using high temperatures (i.e., temperatures greater than 135° C.). Preferably, the rosin resins are soluble in pentaacrylate and hexaacrylate monomers (e.g., dipentaerythritol pentaacrylate and dipentaerythritol hexaacrylate) at ≤120° C., preferably ≤100° C.

Preferably, the rosin resin has a molecular weight of 8,000-35,000 Daltons, preferably 10,000-35,000 Daltons.

Suitable rosin resins for the present application exhibiting good solubility in dipentaerythritol pentaacrylate or dipentaerythritol hexaacrylate typically exhibit a molecular weight of 5000-35000 or 5000-30000 Daltons, measured by size exclusion chromatography; a softening point of 70-135° C., or 85-110° C.; and an acid value of 5-50 mg KOH/g, 10-30 mg KOH/g or 12-25 mg KOH/g. Preferably, the rosin resin has a molecular weight of 5000-35000 Daltons, a softening point of 85-110° C. and an acid value of 10-30 mg KOH/g. More preferably, the rosin resin has a molecular weight of 5000-35000 Daltons, a softening point of 85-110° C.; and an acid value of 12-25 mgKOH/g.

The rosin resins used in the present invention typically have an ethanol number of >4 g/10 g. For example, the rosins resins used in the present invention typically have an ethanol number of 4-10 g/10 g. As will be understood in the art, the ethanol number (EN) provides a measurement of a resins tolerance for ethanol and therefore provides an indication of the polarity of the resin.

Aluminum Additive

Suitable aluminum additives for the present application are an aluminum alkoxide, an aluminum chelate or an aluminum carboxylate. Suitable aluminum alkoxides include aluminum mono-, di-, or tri-propoxylate, aluminum mono-, di-, or tri-isopropoxylate, aluminum mono-, di-, or tri-butyrate, aluminum mono-, di-, or tri-isobutyrate, or blends thereof. Suitable aluminum chelates include aluminum mono-ethylacetoacetate chelate with di-isopropylate, aluminum di- and tri-chelates with alkylacetoacetate or alkyl diketones, or blends thereof. Suitable aluminum carboxylates include aluminum carboxylate selected from the group consisting of aluminum tri acetic acid ester or aluminum tri propionic acid ester, and blends thereof.

Preferably, the aluminum additive is an aluminum chelate. More preferably, the aluminum additive is selected from aluminum mono-ethyl acetoacetate chelate with di-isopropylate; aluminum di- and tri-chelates with alkyl acetoacetate or alkyl diketones, and blends thereof.

Preferably, the aluminum additive is di-isopropoxide ethyl acetoacetate (CAS No. 14782-75-3).

Most of these aluminum additives are commercially available. For better handling of the moisture sensitive additives (for example the di-isopropylate chelates, which can be referred to as alcoholates) and to avoid hydrolytic decay, the aluminum additives can be pre-dissolved in a small amount in an inert solvent, such as for example sunflower oil. Hence, in a preferred aspect of the invention, the aluminum additive is an aluminum alkoxide, an aluminum chelate or an aluminum carboxylate in an inert solvent. Where the aluminum additive is in an inert solvent (such as sunflower oil) the aluminum additive and inert solvent are in a weight ratio of 1:1.

Suitable inert solvents include mineral oils and vegetable oils such as sunflower oil. Preferably, the inert solvent is sunflower oil.

Preferably, the aluminum additive is in sunflower oil in a 1:1 weight ratio.

Preferably, the aluminum additive is an aluminum chelate in an inert solvent. More preferably, the aluminum additive is an aluminum mono-ethyl acetoacetate chelate with di-isopropylate; aluminum di- and tri-chelates with alkyl acetoacetate, alkyl diketone, or blends thereof in an inert solvent.

Preferably, the aluminum additive is an aluminum chelate in sunflower oil. More preferably, the aluminum additive is an aluminum mono-ethyl acetoacetate chelate with di-isopropylate; aluminum di- and tri-chelates with alkyl acetoacetate, alkyl diketone, or blends thereof in sunflower oil.

Preferably, the aluminum additive is di-isopropoxide ethyl acetoacetate in an inert solvent. More preferably, the aluminum additive is di-isopropoxide ethyl acetoacetate in sunflower oil.

In the present application, the aluminum additive is able to react with hydroxyl-, carboxyl- and amine groups in the ink or varnish during the ink or varnish production at elevated temperature at 80-120° C., which positively influences the rheology, especially the structure or the so-called body (viscosity at a low shear rate, i.e. D=2 l/s) of the inks made therefrom and influences the cohesive forces of the ink.

In the present invention, the aluminum additive is present in 0.2-5% of the ink or varnish composition. Preferably, the aluminum additive is present in 0.5-5%, more preferably 0.5-3% of the ink or varnish composition.

Preferably, the ink or varnish composition of the invention comprises 0.2-5% of an aluminum additive in an inert solvent such as sunflower oil. Preferably, the aluminum additive and inert solvent are in a weight ratio of 1:1 such that the composition comprises the aluminum additive in 0.1-2.5% and the inert solvent in 0.1-2.5%.

Polymerization Stabilizer (Also Referred to Herein as Polymerization Inhibitor)

The inks of the present invention may further contain a stabilizer to ensure good shelf-life. Examples of such polymerization inhibitors include nitroso-based stabilizers, such as nitroso-phenylhydroxylamine; phenolic stabilizers such as hydroquinone (HQ), methylether hydroquinone (MEHQ), butylhydroxytoluene (BHT) and 2,6-di-tert-butyl-N,N-dimethylamino-p-cresol, phenothiazine and nitroso-phenylhydroxylamine stabilizers and stabilizers based on copper and zinc thiocarbamates. This component is useful as the varnish and the inks, due to the long wavelength absorbing photoinitiators suitable for LED drying, also absorb visible light, making them prone to premature polymerization.

Preferably, the ink or varnish composition comprises 0.5-5% of one or more polymerization stabilizers.

Varnish Preparation

The varnish of the present invention is made for example by adding the liquid components and the stabilizer into a stirring kettle heating to 80-120° C., then adding the solid rosin resin and optional other solid additives. When the rosin resin is dissolved, the aluminum additive is added and the mixture is stirred for a defined time at temperature, filtered and can then be used to make the LED-curable inks. The varnish is characterized by viscosity at high and low shear rate (D=50 l/s and D=2 l/s respectively) measured with a rheometer and can be further characterized by oscillation experiments to determine the storage modulus, the loss modulus and ratio between storage modulus and loss modulus (tan delta), describing the viscous part and the elastic part of the varnish. The lower tan delta, the higher the degree of reaction with the aluminum additive. Usually, 0.5-5.0 weight % of the aluminum additive is added, depending on the desired viscosity and rheology of the varnish.

Preferably, the varnish compositions of the present invention have a viscosity of 40-150 Pa·s at 23° C. and a shear rate of D=50 l/s, more preferably 60-100 Pas at 23° C. and a shear rate of D=50 l/s, even more preferably 60-80 Pas at 23° C. and a shear rate of D=50 l/s.

The inventive inks of the present application can be made, for example, in a two-step process, by making a premix and grinding. The premix is made by charging the inventive varnish and further monomers into a stirring kettle; starting to stir and subsequently adding the solid components such as colorant, filler and further additives. During mixing the temperature increases up to 40-70° C. and the mixture temperature is maintained until all pigment is wetted. Then, the premix is transferred to a milling process (e.g., three-roll mill or a bead mill) and ground until the desired fineness of grind, measured by a grindometer (e.g., NPIRI gauge) is accomplished.

Colorants

The inks of the present invention may also contain one or more colorants in the form of a dye or pigment dispersed therein. Pigments suitable for use in the present invention include conventional organic or inorganic pigments. Representative pigments may, for example, be selected from the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48:2, Pigment Red 53:1, Pigment Red 57:1, Pigment Red 81:1, Pigment Red 112, Pigment Red 122, Pigment Red 170, Pigment Red 184, Pigment Red 210, Pigment Red 238, Pigment Red 266, Pigment Blue 15, Pigment Blue 15:1, Pigment Blue 15:2, Pigment Blue 15:3, Pigment Blue 15:4, Pigment Blue 61, Pigment Green 7, Pigment Green 36, Pigment Violet 1, Pigment Violet 19, Pigment Violet 23, Pigment Black 7, titanium dioxide in its anatase or rutile modification, zinc oxide, barium sulfate, zinc sulfide, lithopone or calcium carbonate.

Preferably, the ink composition according to the present invention comprises 5-40% of one or more colorants, more preferably 10-30% of one or more colorants.

Additives

The LED-curable inks of the present invention may further contain additives typically used in the art to modify flow, surface tension, gloss, flow, pigment wetting and abrasion resistance of the cured coating or printed ink. Such additives contained in inks or varnishes typically are surface-active agents, waxes (e.g., PE-waxes), shelf-life stabilizers, etc. and combinations thereof. These additives may function as leveling agents, shelf-life stabilizers, wetting agents, slip agents, flow agents, dispersants and de-aerators. In some embodiments, the additives include fluorocarbon surfactants, silicones and organic polymer surfactants. Examples include the Tegorad product lines (Tegorad are trademarks and are commercially available products of Tego Chemie, Essen, Germany) and the Solsperse product lines (Solsperse are trademarks and are commercially available products of Lubrizol Company).

The LED-curable inks of the present invention may further contain extenders typically used in the art such as clay, talc (e.g., micronized talc), calcium carbonate, magnesium carbonate or silica to adjust water uptake and color strength. The inks of the present invention may further contain additives to modify properties such as surface tension, gloss, flow, pigment wetting and abrasion resistance of the printed ink.

Preferably, the ink or varnish compositions of the present invention comprise no more than 5% by weight of a vegetable and/or mineral oil. More preferably, the ink or varnish compositions of the present invention comprises no more than 3% by weight, even more preferably no more than 1.5% by weight of a vegetable and/or mineral oil.

Unless stated otherwise, "vegetable oil" and "mineral oil" refer to non-functionalized oils. That is, unless the vegetable oil is described as being functionalized (e.g., an acrylated epoxidized vegetable oil), the term "vegetable oil" refers to oils derived from seeds or other parts of a fruit without having undergone functionalization (e.g., by chemical reaction) to include a moiety that can participate in the polymerization process. Similarly, the term "mineral oil" refers to petroleum-based hydrocarbon oils that have not undergone any functionalization (e.g., by chemical reaction) to include a moiety that can participate in the polymerization process.

Preferably, the ink or varnish compositions of the present invention comprise no more than 5% by weight of a vegetable oil selected from soybean oil, linseed oil, castor oil or a combination thereof. More preferably, the ink or varnish compositions of the present invention comprises no more than 3% by weight, even more preferably no more than 1.5% by weight of a vegetable oil selected from soybean oil, linseed oil, castor oil or a combination thereof.

Preferably, the ink or varnish compositions of the present invention comprise no more than 5% by weight of a mineral oil. More preferably, the ink or varnish compositions of the present invention comprises no more than 3% by weight, even more preferably no more than 1.5% by weight of a mineral oil.

Preferably, the ink or varnish compositions of the present invention comprise no more than 15% by weight of an organic solvent typically used in UV-curable ink compositions. For example, the ink of varnish composition of the present invention comprises no more than 15% by weight of an alcohol solvent such as methanol, ethanol, propanol, isopropyl alcohol, butanol, ethylene glycol, propylene glycol, diethylene glycol, dipropylene glycol, glycerol or combinations thereof.

Typically, inks of the present invention show a viscosity of about 5-100 Pa·s at 23° C. and a shear rate of D=50 l/s measured with a commercial cone & plate rheometer such as Physika RCS 300 from Anton Paar company Germany, which is a typical stress rheometer and widely used in quality control as well as in research and development. Preferably, the viscosity of the inks is about 40-60 Pas at 23° C. temperature and a shear rate of D=50 l/s.

Typical values for ink flow (incline plate flow) are about 3-15 cm after 15 minutes, measured with an incline aluminum plate with 1 cc of ink.

Preferably, the inks of the present invention show a tack of 200-450 units measured using a "tack-o scope" instrument (Model 2001) from IGT testing systems, Netherlands, which is known to a person skilled in the art. More preferably, the tack is about 230-350 units. The darker colors are usually adjusted higher in tack.

The radiation curable inks of the present invention can be cured by LED-light. The wavelength of the applied LED irradiation can be within a range of about 200 to 500 nm, or about 320 to 400 nm. Preferably, the LED energy is within a range of about 30 to 1000 mJ/cm$^2$, or within a range of about 50 to 500 mJ/cm$^2$. The values are measured by a calibrated radiometer, having a good response in the relevant UVA area, such as a Powerpuck II from EIT company. In addition, the LED source can be appropriately selected according to the absorption spectrum of the radiation curable composition. Moreover, the inks of the present invention can be cured under inert conditions or as an ink laminated by a plastic foil.

In another embodiment, the photoinitiators can be removed and the vanishes and inks of the present invention can be cured by electron beam radiation (EB) (i.e., the ink or varnish composition comprises 0% photoinitiator). Commercially EB-dryers are available for example from Energy Science, Inc. of Wilmington, Mass, or from Advanced Electron Beams Inc. (AEB) of Wilmington, Mass. The energy absorbed, also known as the dose, is measured in units of kiloGrays (kGy), one kGy being equal to 1,000 Joules per kilogram. Typically, the electron beam dose should be within the range of 10 kGy to about 40 kGy for complete curing. With the radiation curable composition of this invention a radiation dose of 20-30 kGy at an oxygen level of <200 ppm is usually sufficient to get a dry, solvent resistant ink.

Unless stated otherwise, all percentages (%) are by weight.

Substrates

The substrate to be printed may be composed of any typical substrate material such as paper, plastics, metals and composites.

Test Methods

Molecular Weight

Usually, the molecular weight can be measured by those techniques known in the art such as gel permeation chromatography. For instance, molecular weight determination may be conducted on a Hewlett-Packard 1050 Series HPLC system equipped with two GPC Ultrastyragel columns, 103 and 104 Å (5 µm mixed, 300 mm×19 mm, Waters Millipore Corporation, Milford, MA, USA) and THF as mobile phase. The molecular weight may be calculated by comparison with a polystyrene standard. The skilled person will appreciate that this definition of molecular weight applies to polymeric materials which typically have a molecular weight distribution. Usually, if not stated otherwise the reported molecular weight (or average molecular weight) is the weight average molecular weight (Mw).

Acid Value of the Rosin Resins

Weigh 0.2-1.0 g sample into a clean 50 ml Erlenmeyer. Dissolve sample in acetone (10-20 ml). Check carefully whether all sample material has been dissolved. Add 3-5 drops of 1% alcoholic phenolphthalein solution. More indicator solution may be needed for colored solutions. Titrate with standardized 0.1 N Alcoholic Potassium Hydroxide (KOH) to first pink color which lasts for 15 seconds. Record number of ml of KOH solution used.

Calculation:

$$\text{Acid Number} = \frac{\text{ml KOH} \times 0.1 \times 56.1 \text{ (mg KOH/g)}}{\text{Sample weight (g)}}$$

Softening Point of Rosin Resin

Mettler drop softening point (MDSP): The softening point can be measured with automated softening point detector DP70 from Mettler Toledo company. Alternatively, the softening point is determined by the Durand method: Three grams of rosin resin is placed in a 17×50 mm test tube and heated to melt the resin. After the resin is allowed to cool to room temperature, 50.0 g of mercury is added to the tube and a thermometer is inserted into the mercury. The tube is heated in a bath at a rate of approximately 2° C./minute. The temperature (° C.) at which the resin first appears above the surface of the mercury is taken as the softening point.

Ethanol Number

Unless stated otherwise, the ethanol number can be measured by weighing 10 g of test resin in an Erlenmeyer flask. The resin is then dissolved in 50 g of toluene at an elevated temperature of ≤80° C. Once all of the resin has been dissolved, the solution is cooled to room temperature (23° C.) and the Erlenmeyer flask is weighed to give "weight 1" in grams. The Erlenmeyer flask is placed on a sheet of white paper with text on it. Ethanol is then added dropwise at room temperature to the Erlenmeyer flask with stirring until the solution becomes cloudy and the text on the sheet of paper is no longer visible. When the text is no longer visible, the titration is stopped, and the Erlenmeyer flask is weighed once more to give "weight 2" in grams. The ethanol number is then calculated by subtracting "weight 1" from "weight 2" and is quoted as g/10 g (i.e., grams of ethanol per 10 grams of resin).

Fineness of Ink Grind

Ensure that the grind gauge (25 μm/0-10 NIPRI) is clean and dust-free, it must be wiped with a solvent-soaked rag before starting the test. The paint is applied in both channels at 25 μm mark. It must be ensured that the color sample does not contain any skin or larger particles. The grind gage block should lay on a flat surface with non-slipping underground. The doctor blade is placed vertically with both hands on the grind gauge block and at a right angle to the grind gage block. The paint is then drawn slowly down to the end of grind gage. The blade should be pressed to the grind gage so that the inks on the left and right is almost completely removed. The μm reading on the grind gauge is recorded at which the at least four scratches made by larger ink particles appear.

Viscosity

Unless stated otherwise, viscosity of the varnish and inks was measured with a Physika 300 cone and plate rheometer from Anton Parr GmbH at a shear rate of D=2-100 1/s. The viscosity value at a shear rate of D=2 1/s (low shear) and D=50 (high shear) is recorded (Pa·s). Unless stated otherwise viscosity was measured at a shear rate of D=50 1/s and at 23° C.

Tack

Tack is measured with a calibrated "Tack-o-scope" instrument (Model 2001) from IGT Testing Systems, Netherlands. 1 ml of ink is placed on the EPDM rubber distribution roller at 30° C., distributed for 90 seconds at a roller speed of 50 rpm, then 30 seconds at 300 rpm. The tack value is then taken at a roller speed of 150 rpm.

Ink Flow

Flow is measured with a vertically arranged aluminum plate on which 1 ml of ink is placed. The distance in cm that the ink ran down the plate after 15 minutes is recorded.

Press Performance and Validation of the Inventive Inks

To further demonstrate the press and print performance of the inventive inks of the present invention versus the comparative inks, inks were printed on a "ManRoland 700" 4-color sheet-fed offset UV-press, equipped with two LED-dryers from AMS company (Power: 17 W/cm$^2$ @ wavelength 385-395 nm). The print test form (motive of the printing plate) is a multicolor design with different images, reflecting the possible challenges of offset printing (e.g., high ink coverage, low ink coverage, gray shades, color strength, sharp printing etc.). The special images used are provided by the FOGRA Research institute for graphic arts, Munich, Germany. Target optical densities are: Black=1.75; Cyan=1.40; Magenta=1.40; Yellow=1.30). For the print test, the graphic paper Arto magic gloss, having a grammage of 130 g/m2 was selected.

The press performance is assessed by press operator using a scoring system. 100 points means an excellent performance. For each print issue which occurs on press, the operator deducts score points. At the end, all remaining score points are summed up to give a final score. The test includes LED-drying performance, print quality and performance on press, which is described hereinafter in detail.

LED ink drying properties, solvent resistance, permanganate staining and ink set-off is tested and rated.

Solvent Resistance

Solvent resistance is assessed by rubbing a cured print with a wet cotton piece soaked with isopropanol over the ink until the ink layer is rubbed through. The more rubs needed to rub through the ink, the better is solvent resistance and cure and the higher the score. The test is stopped at 100 rubs, as this indicates almost perfect cure result giving 100 points. The worst score is a solvent resistance of 0-5 rubs and results in 20 score points being deducted per color from 100.

Potassium Permanganate Staining

A drop of an aqueous potassium permanganate solution (5%) is placed on a selected area of color on the printed and LED dried substrate for 5 seconds. Then, the drop is wiped off and the remaining stain is measured in optical density. The darker the color (density) of the stain, the more uncured residual double-bonds are in the dried color. No staining means no points are deducted, for an optical density >0.25 of the formed spot, 25 score points are deducted from 100.

Set-Off Resistance

After LED drying, a counter paper is placed on printed surface and pressed with 10 tons per cm$^2$ onto the print. Then, the paper is removed and inspected for ink set-off on the counter paper. No ink set-off is regarded as excellent, an ink set-off at >0.2 optical density is regarded as a poor result. No points are deducted for no ink set off; the worst score is set-off density of >0.2 and 20 points would be deducted per ink from 100. More detailed set-off scoring is shown in Table 1.

TABLE 1

Set-off scoring

| Set-off optical density. measured by densitometer | Score points deducted from 100 |
|---|---|
| <0.03 | 0 |
| 0.03-0.05 | −2 |
| 0.05-0.1 | −5 |
| 0.1-0.15 | −10 |
| 0.15-0.2 | −15 |
| >0.2 | −20 |

For quality of the print, rub resistance and gloss is assessed.

Rub-Resistance

The inks prints are placed on a "Sutherland" rub tester and rubbed on the surface for a defined period with a counter paper. The amount of ink rubbed off is inspected visually and a score is given by the means of comparison from excellent to worst. The lower the ink damage and the amount of ink rubbed off, the higher the score. The result is rated from 0 (best)-10 (worst). A 0 or 1 means no score point deduction, a 10 means-20 score point per ink from 100. More detailed rub resistance scoring is shown in Table 2.

TABLE 2

Rub Resistance Scoring
Rub Resistance

| Rating | Score points deducted from 100 |
|---|---|
| 0 | 0 |
| 1 | 0 |
| 2 | −4 |
| 3 | −6 |
| 4 | −8 |
| 5 | −10 |
| 6 | −12 |
| 7 | −14 |
| 8 | −16 |
| 9 | −18 |
| 10 | −20 |

Gloss

Gloss is measured by a BYK Micro Glossmeter at 60°. The higher the gloss, the better the score. One gloss unit on the glossmeter equals one score point. Recorded is the average over all four process colors.

Ink performance on press is assessed by ink duct flow, misting and overall lithographic performance.

Duct Flow

Duct flow is assessed based on how well the ink can leave the ink duct without additional forced agitation. If the ink does not leave the ink duct properly, the transfer via the ink roller system can be slowed or disrupted. The ink duct flow is rated by a press operator, skilled in the art, from 0 (best) to 5 (worst) by comparison. The better the ink duct flow, the higher the score. For an excellent flow out of the ink duct no score points are deducted from 100, for a worse flow 22 points are deducted per ink from 100. More detailed duct flow scoring is shown in Table 3.

TABLE 3

Duct Flow Scoring
Duct Flow

| Rating | Score points deducted from 100 |
|---|---|
| 0 | 0 |
| 0, 5 | −1 |
| 1 | −3 |
| 1, 5 | −5 |
| 2 | −7 |
| 2, 5 | −9 |
| 3 | −11 |
| 3, 5 | −13 |
| 4 | −16 |
| 4, 5 | −19 |
| 5 | −22 |

Misting

Misting can be a severe problem during a print job as it contaminates the press, leading to frequent production stops to clean up the press. Moreover, when tiny acrylate mist droplets enter the air, this can also be a health hazard. Even though press settings and roller diameter can play a role, the chemistry of the ink is regarded as an important factor. Misting is determined by putting blank paper substrate in close distance to selected rollers and the ink mist derived from the roller is deposited on the blank paper for a defined time. Then, the paper with the ink mist on it is compared by eye or measured with a densitometer to determine the amount of ink on the paper. The less ink mist deposited on the paper, the better the 'misting' performance and the higher the score. The misting is rated from 0 (best), meaning no score point deduction, to 5 (worst) where-20 score points are deducted from 100 per color. More detailed misting scoring is shown in Table 4.

TABLE 4

Misting Scoring
Misting

| Rating | Score points deducted from 100 |
|---|---|
| 0 | 0 |
| 0, 5 | 0 |
| 1 | −1 |
| 1, 5 | −2 |
| 2 | −3 |

TABLE 4-continued

Misting Scoring
Misting

| Rating | Score points deducted from 100 |
|---|---|
| 2, 5 | −5 |
| 3 | −7 |
| 3, 5 | −9 |
| 4 | −12 |
| 4, 5 | −16 |
| 5 | −20 |

Lithographic Performance

The overall lithographic performance is assessed by major requirements and print issues which can occur on a sheet-fed offset press, such as for example ink/water balance, scumming, picking, dirtying by another color, over-emulsification, ink in the dampening train, framing, ink piling, as explained thereinafter. These issues are known by a person skilled in the art and given a rating by comparison and a score based on the below-mentioned procedures. At the end, the scores for the individual score results relating to lithography are added up and give the overall lithographic performance score. In the following, the individual requirements for lithographic performance are described.

Ink/Water Balance

The target is to print the offset ink with the lowest amount of fountain solution, while the printing plate is still running free. The ink/water balance is also described by the expression "water window". It is identified by maximum possible range of ink and water settings on press, under which the ink is still running stable. The ink/water balance is rated from 0-5 by the press operator, with zero (best) no score point deduction; and 5 (worst) referring to 20 score points deduction per color from 100.

Scumming

Scumming is the inability of fountain solution to keep the non-image area of the plate clean. Scumming is rated from 0-5 by the press operator, with zero (best) referring to no scumming, giving no score point deduction; and 5 (worst) referring to 20 score points deducted per color from 100.

Picking

Picking means that the ink rips fibers off the paper substrate or pulls off the paper coating. Picking is rated from 0-5 by the press operator, with zero (best) referring to no picking, giving no score point deduction; and a 5 (worst) referring to 20 score points deduction per color from 100.

Dirtying by Another Color

An ink can be contaminated by another ink during the print test, which can cause a color shade shifting, detectable on the print by a shift of the colorimetric data. Dirtying is rated from 0-5 by the press operator, with zero (best) referring to no dirtying, giving no score point deduction; and a 5 (worst) referring to 20 score points deduction per color from 100.

Over-Emulsification

If the ink takes up too much water, it can create a fur-like ink coating being formed on the ink train rollers. Over-emulsification is rated from 0-5 by the press operator, with zero (best) referring to no over-emulsification, giving no score point deduction; and a 5 (worst) referring to 20 score points deduction per color from 100.

Ink in the Dampening Train

Ink is detected in the dampening train by eye and is rated from 0-5 by the press operator, with zero (best) referring to no ink in the dampening train giving no score point deduction; and 5 (worst) referring to 20 score points deduction per color from 100.

Framing

Framing refers to ink being visually seen outside and around the area intended to be printed. Framing is rated from 0-5 by the press operator, with zero (best) referring to no framing, giving no score point deduction; and 5 (worst) referring to 20 score points deduction per color from 100.

Ink Piling

Ink can build up on areas of rollers, blankets and plates, creating a dry accumulation of ink. Piling is rated from 0-5 by the press operator, with zero (best) referring to no piling, giving no score point deduction; and 5 (worst) referring to 20 score points deduction per color from 100.

As previously mentioned, the scoring points of each test results are summed up to give the overall final score. For a better visual understanding, the individual results can be depicted in a spider diagram.

The spider diagram, as shown in FIG. 1, describes the ink performance scores of Inventive Examples 2A-5A versus Comparative Examples. The actual score numbers are also given in the examples.

The invention is further described by the following numbered paragraphs:

1. A printing ink or varnish composition comprising:
   25-85% of one or more acrylates;
   0-20% of one or more photoinitiators;
   5-60% of one or more rosin-modified polyester resins;
   0.2-5% of one or more aluminum additives;
   0.1-5% of one or more polymerization stabilizers; and
   0-50% colorant.
2. The composition of paragraph 1, wherein the composition is curable by UV-LED radiation.
3. The composition of paragraph 1 or 2, wherein the composition comprises 0.5-20% of one or more photoinitiators.
4. The composition of paragraph 1, wherein the photoinitiators are removed and the composition can be cured be electron beam radiation.
5. The composition of preceding paragraph, wherein the composition is an offset printing ink or varnish.
6. The composition of any preceding paragraph, wherein at least one of the photoinitiators is selected from the group consisting of thioxantone, an acylphosphine oxide, an aminobenzophenone, an aminoalkylphenones, a ketocumarine or a mixture thereof.
7. The composition of any preceding paragraph, wherein the aluminum additive is selected from the group consisting of an aluminum alkoxide, an aluminum chelate, an aluminum carboxylate or blends thereof.
8. The composition of paragraph 7, wherein the aluminum additive is an aluminum alkoxide selected from the group consisting of aluminum mono-, di- or tripropoxylate; aluminum mono-, di- or triisopropoxylate; aluminum mono-, di- or tributyrate; aluminum mono-, di- or triisobutyrate, and blends thereof.
9. The composition of paragraph 7, wherein the wherein the aluminum additive is an aluminum chelate selected from the group consisting of aluminum mono-ethyl acetoacetate chelate with di-isopropylate; aluminum di- and tri-chelates with alkyl acetoacetate; or alkyl diketones, and blends thereof.
10. The composition of paragraph 7, wherein the wherein the aluminum additive is an aluminum carboxylate selected from the group consisting of aluminum tri acetic acid ester or aluminum tri propionic acid ester, and blends thereof.
11. The composition of any one of paragraphs 1-7 or 9, wherein the aluminum additive is aluminum di-isopropoxide ethyl acetoacetate.
12. The composition of any preceding paragraph, wherein the rosin-modified polyester resin is derived from a source selected from the group consisting of gum rosin, tall oil rosin, mono-, di-, tri- or tetra-functional polyols, mono-, di-, tri- or tetra-functional acids or anhydrides and blends thereof.
13. The composition of any one of paragraphs 1-11, wherein the rosin-modified polyester resin is derived from a source selected from the group consisting of gum rosin, maleic anhydride, fumaric acid, glycerol, pentaerythritol and blends thereof.
14. The composition of any one of paragraphs 1-11, wherein the rosin-modified polyester resin is derived from a source selected from the group consisting of tetrahydrophthalic anhydride, glycerol, aromatic monofunctional acids, monofunctional alcohols and blends thereof.
15. The composition of any preceding paragraph, wherein the rosin-modified polyester resin exhibits a molecular weight of 2000-100000 Daltons.
16. The composition of any preceding paragraph, wherein the rosin-modified polyester resin has an acid number of 5-50 mg KOH/g.
17. The composition of any preceding paragraph, wherein the softening point of the rosin is in the range of 70-135° C. or 85-110° C.
18. An LED curable offset ink or coating composition which is or which comprises the composition of any one or more of paragraphs 1-17.
19. The composition of paragraph 18, which comprises one or more colorants.
20. The composition of paragraph 18 or 19, wherein the composition comprises 25-85% of the varnish of any one or more of paragraphs 1-17.
21. The composition of any preceding paragraph, exhibiting a ≥5% improvement in ink and press performance score compared to a comparative example without aluminum additive.
22. The composition of any preceding paragraph, exhibiting a ≥10% improvement in ink and press performance score compared to a comparative example without aluminum additive.
23. The composition of any preceding paragraph, exhibiting a ≥15% improvement in ink and press performance score compared to a comparative example without aluminum additive.
24. A printed article comprising the composition of any one or more of paragraphs 1-23.
25. A method of preparing printed matter comprising:
    applying a composition according to any one or more of paragraphs 1-23 to a
    substrate by offset printing; and
    curing the composition by UV-LED or electron beam.

The present invention has been described in detail, including various embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted, to limit the scope of the invention.

Rosin Solubility

Before preparing inventive varnish and ink compositions, the solubility of various rosin resins was determined. As can be seen from the data below in Table 5, whilst rosin resins having a molecular weight of 50,000 and 40,000 Daltons are soluble in ditrimethylolpropane tetraacrylate (DiTMTPA), they are not soluble in dipentaerythritol hexaacrylate (DPHA). It is only when the molecular weight is reduced that the rosin is soluble in the hexafunctional acrylate, dipentaerythritol hexaacrylate.

TABLE 5

Rosin solubility

| | | Rosin 1 | Rosin 2 | Rosin 3 | Rosin 4 | Rosin 5 |
|---|---|---|---|---|---|---|
| Resin property | Acid Value (mgKOH/g) | 9.4 | 11.0 | 13.2 | 15.5 | 16.2 |
| | Softening point (° C.) | 127 | 111 | 98 | 124 | 105 |
| | Molecular weight (Daltons) | 40,000 | 40,000 | 17,000 | 50,000 | 33,000 |
| | Ethanol No (g/10 g) | 2.5 | 3.8 | 4.7 | 2.8 | 4.7 |
| Solubility data (50% solution)[1] | DiTMPTA | Soluble | Soluble | Soluble | Soluble | Soluble |
| | DPHA/DiTMPTA (1:1) | Not soluble | Soluble | Soluble | Soluble | Soluble |
| | DPHA | Not soluble | Not soluble | Soluble | Not soluble | Soluble |

[1]Rosin resins are described as soluble where a 50% by weight solution of said rosin resin in said functional acrylate shows no visible precipitation at room temperature (i.e., 20° C.) after 24 hours.

The inventive and comparative inks of the present application were made in a two-step process, by making a premix at 40-60° C. as described and subsequent grinding on a 3-roll mill until proper pigment particle size (<10 μm for bulk particles) was achieved. After grinding was completed, the ink was ready for printing. The inventive inks and the comparative inks exhibit viscosity 40-60 Pa·s, an incline plate flow of 3-15 cm and a tack of 230-330 units.

TABLE 6

Example 1A Inventive Varnish & Example 1B Comparative Varnish (materials are shown in wt %)

| Material | Ex. 1B (Comp.) | Ex. 1A (Inv.) |
|---|---|---|
| Tetraacrylate monomer | 11.5 | 10.0 |
| Hexaacrylate monomer | 51.6 | 51.0 |
| Polymerization inhibitor 1 | 1.0 | 1.0 |
| Polymerization inhibitor 2 | 2.6 | 2.6 |
| Rosin polyester resin (Mw = 20000, softening point 101° C., Acid value: 14 mg KOH/g | 20.0 | 19.5 |
| Aluminum di-isopropoxide ethyl acetoacetate (CAS no. 14782-75-3) in Sunflower oil 50% | — | 2.6 |
| Phosphine oxide photoinitiator | 1.3 | 1.3 |
| Alpha Aminoacetophenone photoinitiator | 3.2 | 3.2 |
| Thioxanthone photoinitiator | 8.8 | 8.8 |
| Total | 100.0 | 100.0 |

Comparative Ex. 1B varnish exhibits a viscosity of ~65 Pas and shows an almost Newtonian behavior, whereas the Inventive Ex. 1A varnish is slightly higher in viscosity ~75 Pa·s and owns a higher viscosity at low shear rate ("more structure").

TABLE 7

Inventive Yellow Ink Example 2A & Comparative Yellow Ink Example 2B

| Material | Ex. 2B (Comp.) | Ex. 2A (Inv.) |
|---|---|---|
| Triacrylate monomer | 8.5 | 8.5 |
| Aromatic Diacrylate | 5.0 | 5.0 |
| Inventive varnish Ex. 1A | — | 59.0 |
| Comparative varnish Ex. 1B | 59.0 | — |
| Oligomeric aminobenzoate | 2.9 | 2.9 |
| Polymerization Stabilizer | 1.0 | 1.0 |
| Anti-toning agent | 0.2 | 0.2 |
| Dispersant | 2.0 | 2.0 |
| Inorganic filler | 0.7 | 0.7 |
| PE-Wax | 0.5 | 0.5 |
| Micronized talc | 1.7 | 1.7 |
| MAGNESIA | 4.0 | 4.0 |
| YELLOW Pigment 13 | 7.25 | 7.25 |
| YELLOW Pigment 174 | 7.25 | 7.25 |
| Total | 100.0 | 100.0 |

TABLE 8

Inventive Magenta Ink Example 3A & Comparative Magenta Ink Example 3B

| Material | Ex. 3B (Comp.) | Ex. 3A (Inv.) |
|---|---|---|
| Triacrylate monomer | 5.5 | 5.5 |
| Aromatic Diacrylate | 5.0 | 5.0 |
| Inventive varnish Ex. 1A | — | 56.1 |
| Comparative varnish Ex. 1B | 56.1 | — |
| Oligomeric aminobenzoate | 6.0 | 6.0 |
| Polymerization Stabilizer | 2.9 | 2.9 |
| Polymerization Stabilizer | 1.9 | 1.9 |
| Anit toning agent | 0.1 | 0.1 |
| Dispersant | 0.9 | 0.9 |
| PE wax | 0.6 | 0.6 |
| Micronized talc | 1.5 | 1.5 |
| Fumed silica | 1.5 | 1.5 |
| Pigment Red 57 | 18.0 | 18.0 |
| Total | 100.0 | 100.00 |

TABLE 9

Inventive Cyan Ink Example 4A & Comparative Cyan Ink Example 4B

| Material | Ex. 4B (Comp.) | Ex. 4A (Inv.) |
|---|---|---|
| Triacrylate monomer | 5.0 | 5.0 |
| Aromatic Diacrylate | 3.0 | 3.0 |
| Inventive varnish Ex. 1A | — | 56.3 |
| Comparative varnish Ex. 1B | 56.3 | — |
| Hexaacrylate monomer | 6.0 | 6.0 |
| Oligomeric aminobenzoate | 2.9 | 2.9 |

TABLE 9-continued

Inventive Cyan
Ink Example 4A & Comparative Cyan Ink Example 4B

| Material | Ex. 4B (Comp.) | Ex. 4A (Inv.) |
|---|---|---|
| Polymerization stabilizer | 1.9 | 1.9 |
| Anti-toning agent | 0.1 | 0.1 |
| Inorganic filler | 4.0 | 4.0 |
| Micronized talc | 2.0 | 2.0 |
| Fumed silica | 1.5 | 1.5 |
| PE wax | 0.5 | 0.5 |
| Pigment blue 15.3 | 15.5 | 15.50 |
| Dispersant 1 | 0.3 | 0.3 |
| Dispersant 2 | 1.0 | 1.0 |
| Total | 100.0 | 100.0 |

TABLE 10

Inventive Black
Ink Example 5A & Comparative Black Ink Example 5B

| Material | Ex. 5B (Comp.) | Ex. 5A (Inv.) |
|---|---|---|
| Aromatic Diacrylate | 3.0 | 3.0 |
| Inventive varnish Ex. 1A | — | 50.8 |
| Comparative varnish Ex. 1B | 50.8 | — |
| Hexaacrylate monomer | 7.0 | 7.0 |
| Oligomeric aminobenzoate | 2.9 | 2.9 |
| Polymerization stabilizer | 1.9 | 1.9 |
| Photoinitiator for blacks | 2.0 | 2.0 |
| Anti-toning agent | 0.1 | 0.1 |
| Dispersant 1 | 1.5 | 1.5 |
| PE-wax | 0.5 | 0.5 |
| Inorganic filler | 1.5 | 1.5 |
| Micronized talc | 2.0 | 2.0 |
| Fumed silica | 1.5 | 1.5 |
| Pigment blue 15.3 | 3.2 | 3.2 |
| Pigment violet 23 | 0.6 | 0.6 |
| Pigment Black 7 | 17.0 | 17.0 |
| Dispersant 2 | 1.0 | 1.0 |
| Triacrylate Monomer | 3.5 | 3.5 |
| Total | 100.0 | 100.0 |

Table 11 gives the summary of the score of the performance of Inventive Examples 2A-5A vs. Comparative Examples 2B-5B.

TABLE 11

Press and print performance (score) of the Inventive ink examples (with aluminum additive) vs Comparison ink examples (without aluminum additive).

| | Lithographic Performance | Solvent resistance | Set off resistance | Gloss | Printing Quality | Rub-Resistance | Duct flow | Misting | Total score |
|---|---|---|---|---|---|---|---|---|---|
| Inventive Ink | 75 | 97 | 100 | 52 | 75 | 62 | 88 | 86 | 635 |
| Comparison Ink | 41 | 77 | 72 | 58 | 84 | 68 | 82 | 65 | 552 |

Table 11 clearly indicates that the aluminum additive improves the overall performance (especially lithographic performance) and reduces the misting of the inventive ink (higher score) vs the comparative ink. Though the aluminum additives are incorporated into a varnish in the examples, it is understood that the aluminum could just as easily be added directly into the inks themselves.

For a better visual understanding, the individual results can be depicted in a spider diagram. The spider diagram illustrates the ink performance scores of Inventive Examples 2A-5A versus Comparative Examples 2B-5B.

In the spider diagram of FIG. 1, it can be clearly observed that the inventive 4-color ink set, containing the aluminum additive (outer curve shape), covers more diagram space than the comparative ink set (inner curve shape), meaning that it is the better performing ink, especially in terms of misting, lithographic performance and ink drying, assessed by solvent resistance and set-off test.

The present invention has been described in detail, including various embodiments thereof. However, it will be appreciated that those skilled in the art, upon consideration of the present disclosure, may make modifications and/or improvements on this invention that fall within the scope and spirit of the invention.

The invention claimed is:

1. A printing ink or varnish composition comprising:
   25-85% of one or more acrylates, wherein at least one acrylate is a pentaacrylate or hexaacrylate;
   0-20% of one or more photoinitiators;
   5-60% of one or more rosin-modified polyester resins, wherein the rosin-modified polyester resin has a molecular weight of 5,000 to 35,000 Daltons;
   0.2-5% of one or more aluminum additives;
   0.1-5% of one or more polymerization stabilizers; and
   0-50% colorant, wherein the rosin-modified polyester resin is derived from i) a gum-rosin, wood rosin or tall oil rosin; ii) one or more difunctional acids or anhydrides; iii) one or more mono-, di-, tri- or tetra-functional polyols; and iv) one or more monofunctional acids.

2. The composition of claim 1 wherein the rosin-modified polyester resin has a molecular weight of 5,000 to 35,000 Daltons, an acid value of 10-30 mgKOH/g and a softening point of 85-110° C.

3. The composition of claim 1 wherein the composition comprises no more than 5% of a vegetable and/or mineral oil.

4. The composition of claim 1 wherein at least one acrylate is a pentaacrylate.

5. The composition of claim 4, wherein the pentaacrylate is dipentaerythritol pentaacrylate.

6. The composition of claim 1 wherein at least one acrylate is a hexaacrylate.

7. The composition of claim 6, wherein the hexaacrylate is dipentaerythritol hexaacrylate.

8. The composition of claim 1, wherein the composition is curable by UV-LED radiation.

9. The composition of claim 1, wherein the composition comprises 0.5-20% of one or more photoinitiators.

10. The composition of claim 1, wherein the composition comprises 0% photoinitiators (i.e., the composition is free of photoinitiators) and the composition is curable by electron beam radiation.

11. The composition of claim 1, wherein at least one of the photoinitiators is selected from the group consisting of thioxantone, an acylphosphine oxide, an aminobenzophenone, an aminoalkylphenones, a ketocumarine or a mixture thereof.

12. The composition of claim 1, wherein the aluminum additive is selected from the group consisting of an aluminum alkoxide, an aluminum chelate, an aluminum carboxylate or blends thereof.

13. The composition of claim 12, wherein the aluminum additive is:
(a) an aluminum alkoxide selected from the group consisting of aluminum mono-, di- or tripropoxylate; aluminum mono-, di- or triisopropoxylate; aluminum mono-, di- or tributyrate; aluminum mono-, di- or triisobutyrate, and blends thereof;
(b) an aluminum chelate selected from the group consisting of aluminum mono-ethyl acetoacetate chelate with di-isopropylate; aluminum di- and tri-chelates with alkyl acetoacetate or alkyl diketones, and blends thereof; or
(c) an aluminum carboxylate selected from the group consisting of aluminum tri acetic acid ester or aluminum tri propionic acid ester, and blends thereof.

14. The composition of claim 1, wherein the aluminum additive is aluminum di-isopropoxide ethyl acetoacetate.

15. The composition of claim 1, wherein the aluminum additive is in an inert solvent, wherein the inert solvent is selected from a mineral oil or vegetable oil.

16. The composition of claim 1 wherein the rosin-modified polyester resins is derived from i) a gum-rosin, wood rosin or tall oil rosin, ii) one or more difunctional acids or anhydrides selected from maleic acid, maleic anhydride, cyclohexene dicarboxylic acid dianhydride or methyl cyclohexene dicarboxylic acid dianhydride; iii) one or more mono-, di-, tri- or tetra-functional polyols selected from glycerol or trimethylol propane; and iv) one or more monofunctional acids selected from benzoic acid, methyl benzoic acid, tert-butyl benzoic acid, naphthoic acid and linoleic acid.

17. The composition of claim 16, wherein the rosin-modified polyester resin is derived from i) a gum-rosin or tall oil rosin; ii) one or more difunctional acids or anhydrides selected from cyclohexene dicarboxylic acid dianhydride or methyl cyclohexene dicarboxylic acid dianhydride; iii) one or more mono-, di-, tri- or tetra-functional polyols, selected from glycerol or trimethylol propane; and iv) one or more monofunctional acids selected from benzoic acid, methyl benzoic acid, tert-butyl benzoic acid, naphthoic acid and linoleic acid.

18. The composition of claim 16 wherein the rosin-modified polyester resin is derived from i) a gum-rosin or tall oil rosin; ii) one or more difunctional acids or anhydrides selected from cyclohexene dicarboxylic acid dianhydride or methyl cyclohexene dicarboxylic acid dianhydride; iii) one or more mono-, di-, tri- or tetra-functional polyols, selected from glycerol or trimethylol propane; and iv) benzoic acid.

19. The composition of claim 1, wherein:
(a) the rosin-modified polyester resin exhibits a molecular weight of 8,000-35,000 Daltons; and/or
(b) the rosin-modified polyester resin has an acid number of 12-25 mg KOH/g.

20. An LED curable offset ink or coating composition which is or which comprises the varnish composition of claim 1.

21. The composition of claim 1, exhibiting a ≥5% improvement in ink and press performance score compared to a comparative example without aluminum additive, preferably exhibiting a ≥10% improvement in ink and press performance score compared to a comparative example without aluminum additive, more preferably exhibiting a ≥15% improvement in ink and press performance score compared to a comparative example without aluminum additive.

22. A printed article comprising the composition of claim 1.

23. A method of preparing printed matter comprising:
applying a composition according to claim 1 to a substrate by offset printing; and
curing the composition by UV-LED or electron beam.

24. A printing ink or varnish composition comprising:
25-85% of one or more acrylates, wherein at least one acrylate is a pentaacrylate or hexaacrylate;
0-20% of one or more photoinitiators;
5-60% of one or more rosin-modified polyester resins, wherein the rosin-modified polyester resin has a molecular weight of 5,000 to 35,000 Daltons;
0.2-5% of one or more aluminum additives;
0.1-5% of one or more polymerization stabilizers; and
0-50% colorant, wherein the rosin-modified polyester resin is derived from i) a gum-rosin, wood rosin or tall oil rosin; ii) one or more difunctional acids or anhydrides; iii) one or more mono-, di-, tri- or tetra-functional polyols; and iv) one or more monofunctional acids; and
wherein the rosin-modified polyester resin has a molecular weight of 5,000 to 35,000 Daltons and/or a softening point of 85-110° C.

* * * * *